May 30, 1939.  E. A. HECTOR  2,160,544
SIGN
Filed March 14, 1936   2 Sheets-Sheet 2
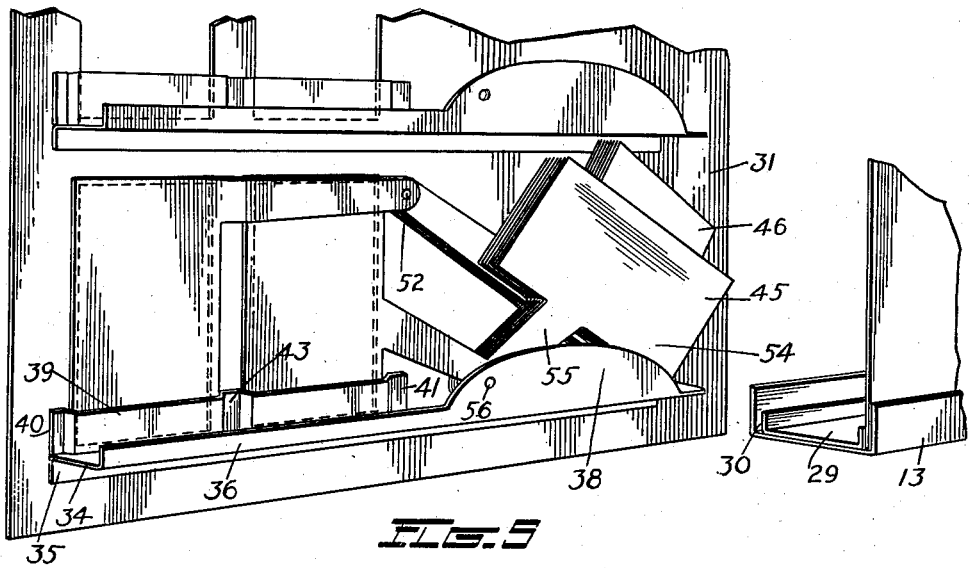
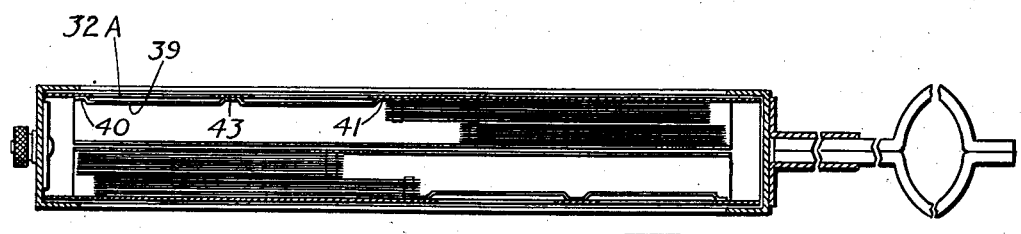
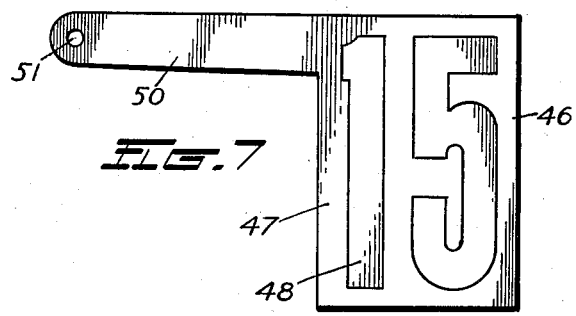
Inventor
Ernest A. Hector
By Richmond S. Hayes
His Attorney Patented May 30, 1939

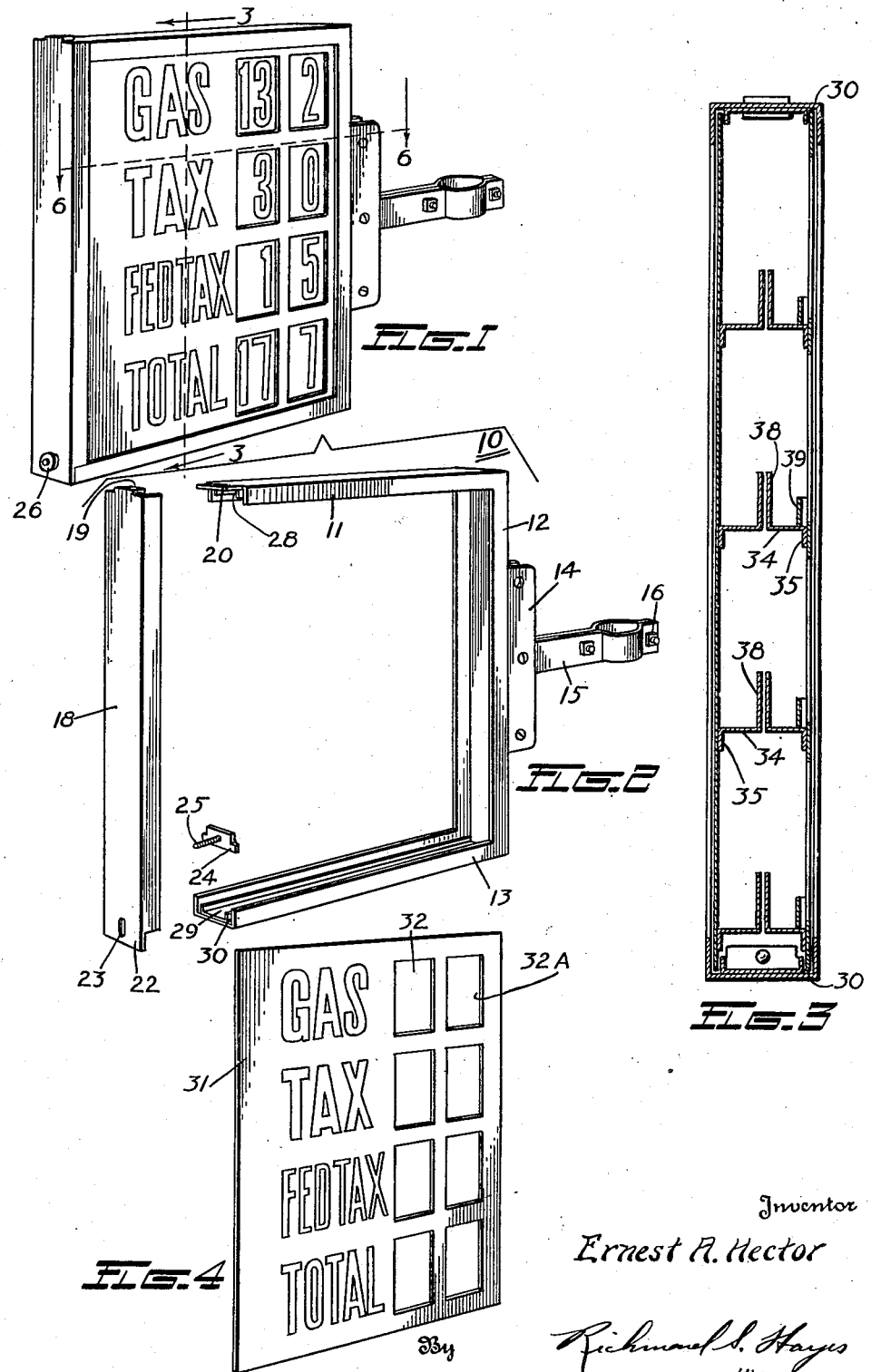

2,160,544

UNITED STATES PATENT OFFICE 2,160,544

SIGN

Ernest A. Hector, Jamestown, N. Y.

Application March 14, 1936, Serial No. 68,911

8 Claims. (Cl. 40—67)

This invention relates to an improvement in signs and particularly to that class of signs utilized in advertising prices of various commodities.

The preferred embodiment of the invention discloses a sign which is adapted for use in advertising prices of various commodities such, for example, as are distributed at gasoline filling stations. The sign is shown arranged with several sets of windows through which figures may be viewed, thus making possible the showing of several items of cost and the total thereof. This arrangement enables the customer to readily ascertain the itemized price of his purchase and also facilitates compliance with laws of some States which require a net gasoline price, State and Federal tax and total. Any of the figures may be readily changed since a plurality of number plates or other suitable legend plates are provided for each window.

Prior to this invention the practice has been to provide a frame in which a single card sign is secured. This sign showed either the total cost of gasoline per gallon or was in tabulated form, giving the total cost of gasoline in quantities from two to fifteen gallons. The single price sign, where several items make up this price, is particularly objectionable in gasoline filling stations by reason of the fact that, although the Federal government levies a fixed tax per gallon of gasoline, the States are not uniform in taxing this commodity. To the traveler, therefore, an itemized price sign speaks for itself and saves an attendant or owner of a station considerable annoyance, explanation, and possible embarrassment. A further objection to present signs displayed in gasoline filling stations lies in the necessity for having printed a few price cards every time the price of gasoline varies a fraction of a cent in cost per gallon. Inasmuch as many persons have been deliberately or accidentally misled by single item price signs for gasoline, notice of several of the State governments has been directed to this condition and some of the States have, as a result, enacted laws which make it compulsory for gasoline filling stations to display itemized price signs of gasoline per gallon.

One of the objects of the invention lies in the provision of a sign for advertising prices of various commodities.

Another object of the invention lies in the provision of an itemized price sign wherein several charges go to make up a given total cost.

Another and further object of the invention lies in the provision of a price sign having a convenient arrangement of parts which permit ready alteration of price quotation.

Another and further object of the invention lies in the provision of a price sign of simple construction, the parts being substantial and well protected for out of door use.

Other and further objects of the invention will be more fully understood from a consideration of the following specification taken in conjunction with the accompanying drawings and in which Fig. 1 is a perspective view of a price sign embodying one modification of the invention;

Fig. 2 is a perspective view of the frame and mounting means.

Fig. 3 is an enlarged vertical sectional view of the frame being taken substantially as indicated at 3—3 of Fig. 1;

Fig. 4 is a perspective view of one of the two face plates mounted in the frame and through the windows of which the itemized prices may be read;

Fig. 5 is a rear perspective view of the face plate shown in Fig. 4 and discloses the support for the number or other legend plates which may be moved into the windows of the face plate;

Fig. 6 is an enlarged horizontal sectional view of the device taken substantially on the line 6—6 of Fig. 1; and Fig. 7 is a side elevation of one of the number plates.

Referring to the drawings, one modification of the invention is shown to comprise a frame generally indicated by the reference numeral 10. This frame includes channel elements 11, 12, and 13 which are welded or otherwise suitably joined together at abutting edges to form three sides of the frame 10. Attached to the element 12 is a suitable bracket 14 from which projects laterally a split clamp arm 15. Adjustment of bolts 16 in the arm 15 secures the device upon any suitable upright pipe or post which may be adjacent to or form part of a gasoline filling pump. It will be understood that any other suitable mounting may be provided by which to support the sign. The fourth side of the frame is closed by a channel element 18 which terminates at its upper end in an inwardly directed tongue 19. Formed in the free end of the element 11 is a tongue 20 having a slot adapted to receive the tongue 19. Tongues 19 and 20 form a convenient hinge for securing the channel element 18 to close the frame 10, but it is obvious that any other suitable connection, such, for example, as a conventional hinge, may be utilized, the only requirement being that the channel element 18 may be swung into the same plane as channel element 11 for the purpose of removing or inserting the price elements of the sign. The lower end of the channel element 18 may be formed with a tongue 22 through which a slot 23 is made. Secured adjacent the free edge of element 13 is a plate 24 on which is mounted a bolt 25. When the channel element 18 is fastened at its upper end to the element 11, the lower end may be swung into place, bolt 25 projecting through slot 23. A nut 26 engages the bolt 25 and secures this end of the channel member in place. It will also be apparent that this method of fastening the swinging or free end of the channel element 18 is subject to variation, since other fastening means may be readily utilized for this purpose.

In the upper and lower channel elements 11 and 13 are channel shaped guide plates 28 and 29. Each plate is centered with respect to the element in which it is mounted to provide narrow guide-ways 30. A face plate 31 is adapted to be inserted in the frame 10, the upper and lower edges of which project into the guide-ways 30. This plate, as viewed from the front (Fig. 4) is shown with two vertical rows of windows 32 and 32a. In the present disclosure three items of cost are to be considered, namely, the net cost of gasoline per gallon, the State tax per gallon, and the Federal tax per gallon. Beneath the last item, provision is made for totaling these amounts. Therefore, in every instance where three charges are to be itemized and totaled, there will be four windows in each vertical row. If there are fewer or more items of cost, the number of windows will be accordingly varied. It will, of course, be understood that the commodity costs itemized in the disclosure are merely illustrative and are not to be considered the only application of the device.

Reference is now had more particularly to Fig. 5 of the drawings which show the structure mounted on the rear of the face plate 31. Directly beneath each horizontal pair of windows 32 and 32a, is a shelf 34. This shelf includes a downwardly directed flange 35 which is joined to the plate 31 in any suitable manner as by welding. Along the free edge of shelf 34 is an upstanding flange 36 which, remote from the windows, is of increased height to provide a wall 38 for pocketing the number or other legend plates. Resting upon the shelf 34 is a guide strap 39 which is secured to the remote walls of the windows along offset flanges 40 and 41, in any suitable manner as by welding. A central offset flange 43 forming a part of the guide strap 39 is secured by welding to the strip between adjacent windows. Located in the space formed by wall 38, shelf 34 and plate 31, are two sets of number or other legend plates 45 and 46. Each of the plates 46 (see Fig. 7) comprises a rectangular portion 47 on which a suitable number or legend 48 is impressed, fastened, or painted. Projecting from one corner of the portion 47 is an arm 50, the end of which is provided with an opening 51. All of the plates 46 are mounted on a pin 52 which is supported on the rear face of the plate 31 adjacent one of the windows 32. Plates 46 may be individually swung about the pivot 52 into position to the rear of window 32a, the lower end of said plate projecting into the pocket formed by the plate 31 and guide strap 39. Each plate 45 comprises a rectangular portion 54 from which an arm 55 projects. At the end of each arm 55 a suitable opening is made to receive a pivot pin 56 which projects through wall 38, being secured in any suitable manner to the rear plate 31.

It will be noted that all of the plates 45 and 46 lie within the depth limits of shelf 34 and consequently these plates cannot be pivotally moved into or out of position with respect to windows 32 and 32a, if a further shelf 34 is located directly thereabove as shown in Fig. 5. It is pointed out, however, that the plates 45 and 46 are made of flexible sheet metal and are susceptible to being bent outwardly from beneath the shelf to be swung into or out of place at such time as this part of the device is accessible for this purpose.

Attention is directed to the fact that the frame 10 is of sufficient depth to accommodate two face plates 31 and supported elements in a back to back arrangement so that opposite faces of the sign may be read. The location and arrangement of these plates and elements is clearly shown in Figs. 3 and 6. Although not shown, it is contemplated to provide a glass or other transparent enclosure for the windows 32 and 32a or the entire face plate 31 to protect the face of the sign from the elements when said sign is used out of doors.

Although applicant has shown and described only one modification of his invention, it will be understood that other modifications or adaptations of the invention are contemplated in so far as they lie within the spirit and scope of the invention as described in the hereunto annexed claims.

Having thus set forth my invention what I claim as new and for which I desire protection by Letters Patent is:

1. In a sign for displaying commodity prices, a pair of frontal plates, a frame for receiving and mounting said plates in spaced opposed relationship, means securing said plates against removal from said frame, each of said plates having a plurality of windows located adjacent a commodity list, a group of numbered plates adjacent each of said windows, supporting means at the rear of said plates for said numbered plates, said numbered plates being individually movable from said supporting means into registry with said windows.

2. In a sign for displaying commodity prices, a pair of frontal plates, a frame for receiving and mounting said plates in spaced opposed relationship, means securing said plates against removal from said frame, each of said plates having a plurality of windows located adjacent a commodity list, a shelf secured to the rear of each of said plates adjacent each horizontal row of windows, a group of numbered plates adjacent each of said windows, said plates when not in register with said windows being supported on said shelf.

3. In a sign for displaying commodity prices, a pair of frontal plates, a frame for receiving and mounting said plates in spaced opposed relationship, means securing said plates against removal from said frame, each of said plates having a plurality of windows located adjacent a commodity list, a shelf secured to each of said plates directly beneath each horizontal row of windows, a group of numbered plates adjacent each of said windows, said numbered plates being pivotally mounted for movement from off said shelf into registry with said windows, said shelf serving to prevent manipulation of a group of numbered plates directly therebeneath when said frontal plates are encased in said frame.

4. In a sign for displaying a commodity price, a frontal plate, a frame for mounting and enclosing said plate, said plate having a pair of windows located adjacent a commodity list, a plurality of legend plates, connecting means on each of said legend plates, said means being pivotally joined to the rear of said frontal plate, and causing certain of said legend plates to be brought selectively into registry with one of said windows and the remainder of said legend plates to be brought selectively into registry with the other of said windows.

5. In a sign for displaying a commodity price, a frontal plate, a frame for mounting and enclosing said plate, said plate having a pair of windows located adjacent a commodity list, a group of legend plates for each of said windows, all of said legend plates being located adjacent one of said windows when not in use, arms on each of said legend plates, said arms being pivotally secured to said frontal plate and serving to guide certain of said legend plates into registry with one of said windows and the remainder of said legend plates into registry with the other of said windows.

6. In a sign for displaying a commodity price, a frontal plate, said plate having a pair of windows located adjacent a commodity list, a group of legend plates for each of said windows, arms on all of said plates, means pivotally securing the arms of each group of legend plates to said frontal plate, certain of said arms being of a size to guide one group of said legend plates into registry with one of said windows, the remainder of said arms being of a different size to guide the other of said group of legend plates into registry with the other of said windows.

7. In a sign for displaying a commodity price, a frontal plate, said plate having a pair of windows located adjacent a commodity list, a group of legend plates adjacent each of said windows, arms on all of said plates, means pivotally securing the arms of each group of legend plates to said frontal plate, certain of said arms being of a size to guide one group of said legend plates into registry with one of said windows, the remainder of said arms being of a different size to guide the other of said group of legend plates into registry with the other of said windows, and means adapted to cause said legend plates, when in registry with said windows to contact the rear face of said frontal plate.

8. In a sign for displaying a commodity price, a frontal plate, a frame for receiving and mounting said plate, means securing said plate against removal from said frame, said plate having a plurality of windows located adjacent a commodity list, a group of numbered plates adjacent each of said windows, supporting means at the rear of said frontal plate for each group of said numbered plates, said numbered plates being pivotally secured to said frontal plate and being individually movable from said supporting means into registry with said windows.

ERNEST A. HECTOR.